United States Patent
Edwards et al.

(10) Patent No.: US 7,238,413 B2
(45) Date of Patent: Jul. 3, 2007

(54) CONDUCTIVE SHEET MATERIAL

(75) Inventors: Stephen John Edwards, Cumbria (GB); Nigel Julian Walker, Cumbria (GB)

(73) Assignee: Technical Fibre Products Limited (GB)

( * ) Notice: Subject to any disclaimer, the term of this patent is extended or adjusted under 35 U.S.C. 154(b) by 515 days.

(21) Appl. No.: 10/240,799

(22) PCT Filed: Apr. 12, 2001

(86) PCT No.: PCT/GB01/01653

§ 371 (c)(1),
(2), (4) Date: Feb. 7, 2003

(87) PCT Pub. No.: WO01/80334

PCT Pub. Date: Oct. 25, 2001

(65) Prior Publication Data

US 2003/0165740 A1  Sep. 4, 2003

(30) Foreign Application Priority Data

Apr. 17, 2000 (GB) .................... 0009319.5

(51) Int. Cl.
*A01K 1/015* (2006.01)
*B32B 9/00* (2006.01)
(52) U.S. Cl. ..................... 428/221; 428/408
(58) Field of Classification Search ............ 428/297.4, 428/408, 221; 429/42; 423/447.1, 447.2; 106/31.29; 526/341, 342; 527/400

See application file for complete search history.

(56) References Cited

U.S. PATENT DOCUMENTS

| 3,865,705 | A | * | 2/1975 | Rieux et al. ............... 428/367 |
| 5,576,162 | A | | 11/1996 | Papadopoulos |
| 5,800,706 | A | | 9/1998 | Fischer |
| 5,985,112 | A | | 11/1999 | Fischer |
| 6,099,965 | A | * | 8/2000 | Tennent et al. ............. 428/408 |
| 6,665,169 | B2 | * | 12/2003 | Tennent et al. ............. 361/303 |
| 6,713,034 | B2 | * | 3/2004 | Nakamura et al. ........ 423/447.2 |
| 6,949,308 | B2 | * | 9/2005 | Edwards et al. ............. 429/42 |
| 6,960,389 | B2 | * | 11/2005 | Tennent et al. ............. 428/408 |

FOREIGN PATENT DOCUMENTS

| WO | WO 00 19461 A | 4/2000 |
| WO | WO 01 80342 A | 10/2001 |

* cited by examiner

*Primary Examiner*—N. Edwards
(74) *Attorney, Agent, or Firm*—Woodard, Emhardt, Moriarty, McNett & Henry LLP

(57) ABSTRACT

A conductive microporous sheet material comprises primary carbon fibres having a cross-sectional dimension of at least 1 μm, secondary carbon fibres in the form of carbon nanofibres and a binding agent for binding said primary and secondary fibres. The material may be produced by a wet-laid non-woven (paper-making) process. The sheet material may be used as a gas diffusion layer for a fuel cell or an electrode material for a battery.

23 Claims, No Drawings

CONDUCTIVE SHEET MATERIAL

The present invention relates to a conductive microporous sheet material for use in electrical devices, particularly but not exclusively for batteries and related devices.

There is an increasing demand for sheet materials which have a microporous structure combined with electrical conductivity and a high level of chemical resistance. Such materials find application as gas diffusion layers for fuel cells and as electrode materials for batteries. The present invention seeks to provide materials which meet these requirements as well as a method for the manufacture of such materials.

According to the present invention there is provided a conductive microporous sheet material comprising primary carbon fibres having a cross-sectional dimension of at least 1 μm, secondary carbon fibres in the form of carbon nanofibres and a binding agent for binding said primary and secondary fibres.

The sheet of the invention has a microporous structure determined primarily by the relative proportions of the first and second fibres. The variation in pore structure with the secondary (nanofibre) content may readily be determined experimentally by a person skilled in the art. Thus, for example, the sheet may be produced by a wet-laying technique (see below) and the experimental determination may be effected by producing and testing laboratory produced single sheets (hard sheets). This information may then be used to select the appropriate blend of primary and secondary fibres for a given microporous structure.

The sheet of the invention may be a thin, flexible material.

The primary fibres preferably have a cross-section of 1 to 15 μm, more preferably 4 to 12 μm, even more preferably 5 to 10 μm. Typically the primary fibres will have a length of a few millimetres, e.g. 3 to 8 mm (about 6 mm). A preferred example of primary carbon fibre is SGL C25 (available from Technical Fibre Products Ltd.).

The primary fibres may be obtained from acrylonitrile or pitch.

The secondary fibres (nanofibres) preferably have a cross section of between 100 and 500 nanometres, more preferably between 100 and 250 nanometres. The nanofibres may be produced by vapour deposition. A preferred example of a carbon nanofibre is Pyrograf-III (available from ASI).

Preferably the primary carbon fibre constitutes between 10 and 90 wt % of the total weight of fibres and secondary fibres constitute between 10 and 90 wt % on the same basis. Preferably the fibres together provide at least 90% by weight of the sheet material.

The binding agent is required for adequate bonding strength of the material. The binding agent will generally constitute less than 10% by weight of the sheet material, and more typically less than 5% on the same basis.

The binding agent may for example be a thermoplastic or thermosetting resin, a suitable example of which is a phenolic resin such as GP5520. Whilst the use of resin binding agent is perfectly satisfactory, improved conductivity can generally be achieved by use of carbon as the binding agent. Sheets utilising carbon as the binding agent may be produced by heat treatment in an inert atmosphere of a sheet material incorporating a resin binding agent, said conversion of the resin binding agent to carbon serving to increase conductivity whilst retaining the controlled microporous structure.

A sheet according to the present invention may have any one or any combination of the following properties:—
  A. A weight of between 10 and 200 $g/m^2$, more preferably about 50 $g/m^2$.
  B. A thickness of between 0.1 and 2 mm, more preferably about 0.3 mm.
  C. A Gurley air permeability of between 8 and 50 seconds/300 $cm^3$.
  D. A maximum pore size of less than 22 μm, more preferably less than 16 μm and most preferably less than 12 μm.
  E. A through plane resistance of less than 150 Ω/cm, more preferably less than 50 Ω/cm.
  F. A tensile strength of between 0.7 and 1.3 kN/m.

Conductive sheet material in accordance with the invention has a variety of end uses, including:—
  (1) Gas diffusion layers for fuel cells
  (2) Electrode materials for batteries.

The conductive sheet material, according to the invention is preferably produced using a wet-laid non-woven (papermaking) process. The use of a wet-laid production process allows a wide range of proportions of carbon fibres and carbon nanofibres to be used and thus lends itself to production of materials with highly specific pore structures.

The preferred method of manufacture is to form a slurry of the two fibre types with binder by mixing the materials in water at a concentration of up to 1% by weight (e.g. between 0.02 and 0.5 wt %). Mixing is preferably carried out using a high speed agitator and the resulting slurry is formed into a suitable sheet material by passing through a papermaking former.

Fibre distribution and sheet forming may be aided by the use of viscosity modifiers and/or drainage aids.

After forming liquid may be removed from the sheet by vacuum and/or hot air drying. Where both liquid removal methods are used it is preferred that hot air drying is applied ultimately as it may be used to melt or cure the binder. It is preferred that the final stage of the production process is the carbonisation of the binding agent.

Following the carbonisation stage the sheet material is preferably formed into a continuous roll in order to facilitate further automated processing.

Both continuous of batch processing of the sheet material are envisaged.

Preferably in the production process the binder is initially the form of a powder although the use of a binder in any other physical form is not precluded.

The invention will now be described further with reference to the following non-limiting Examples.

EXAMPLE 1

A sheet was formed by mixing the following elements in water using a high speed agitator at a combined concentration of 0.5 wt %.

| | |
|---|---|
| Carbon fibre (SGL C25), 6 mm chopped length | 24 wt % |
| Carbon nanofibre (Pyrograf-III, ex ASI) | 73 wt % |
| Phenolic resin (GP 5520) | 2 wt % |

The resulting material was converted into sheet form using a papermaking former. The sheet was dried using a combination of vacuum and hot air and then carbonised by heating in an inert atmosphere until the phenolic binder was completely converted to carbon.

Sheets formed from the above mixture had the following characteristics:—

| | |
|---|---|
| Weight | 50 g/m² |
| Thickness | 0.3 mm |
| Tensile strength | 0.7 kN/m |
| Gurley air permeability | 50 seconds/300 cm³ |
| Maximum pore size | 12 μm |
| Through plane resistance | 150 Ω/cm |

EXAMPLE 2

A sheet was formed by mixing the following elements using the same technique as in Example 1.

| | |
|---|---|
| Carbon fibre (SGL C25), 6mm chopped length | 49 wt % |
| Carbon nanofibre (Pyrograf-III, ex ASI) | 49 wt % |
| Phenolic resin (GP 5520) | 2 wt % |

Sheets formed from the above mixture had the following characteristics:—

| | |
|---|---|
| Weight | 50 g/m² |
| Thickness | 0.3 mm |
| Tensile strength | 1.0 kN/m |
| Gurley air permeability | 20 seconds/300 cm³ |
| Maximum pore size | 16 μm |
| Through plane resistance | 150 Ω/cm |

EXAMPLE 3

A sheet was formed by mixing the following elements using the same technique as in Example 1.

| | |
|---|---|
| Carbon fibre (SGL C25), 6mm chopped length | 74 wt % |
| Carbon nanofibre (Pyrograf-III, ex ASI) | 24 wt % |
| Phenolic resin (GP 5520) | 2 wt % |

Sheets formed from the above mixture had the following characteristics:—

| | |
|---|---|
| Weight | 50 g/m² |
| Thickness | 0.3 mm |
| Tensile strength | 1.3 kN/m |
| Gurley air permeability | 8 seconds/300 cm³ |
| Maximum pore size | 22 μm |
| Through plane resistance | 150 Ω/cm |

The invention claimed is:

1. A conductive microporous sheet material comprising primary carbon fibers having a cross-sectional dimension of at least 1 μm, secondary carbon fibers in the form of carbon nanofibers and a binding agent for binding said primary and secondary fibers, wherein the binding agent constitutes less than 10 wt % of the sheet material and the binding agent is selected from the group comprising thermoplastic resins and thermosetting resins; and wherein the sheet has a tensile strength of between 0.7 and 1.3 kN/m.

2. A sheet material according to claim 1, wherein the secondary carbon fibers have a cross section of between 100 and 500 nanometres.

3. A sheet material according to claim 2, wherein the secondary carbon fibers have a cross section of between 100 and 250 nanometres.

4. A sheet material according to claim 1, wherein the primary carbon fibers constitute between 10 and 90 wt % of the total weight of fibers.

5. A sheet material according to claim 1, wherein the secondary carbon fibers constitute between 10 and 90 wt % of the total weight of fibers.

6. A sheet material according to claim 1, wherein the binding agent constitutes less than 5 wt % of the sheet material.

7. A sheet material according to claim 1, wherein the binding agent is a phenolic binder.

8. A sheet material according to claim 1, wherein the binding agent is carbon.

9. A sheet material according to claim 1, wherein the sheet has a weight of between 10 and 200 g/m².

10. A sheet material according to claim 9, wherein the sheet has a weight of about 50 g/m².

11. A sheet material according to claim 1, wherein the sheet has a thickness of between 0.1 and 2 mm.

12. A sheet material according to claim 11, wherein the sheet has a thickness of about 0.3 mm. fibers in the form of carbon nanofibers and a binding agent for binding said primary and secondary fibers, wherein the binding agent constitutes less than 10 wt % of the sheet material and the binding agent is selected from the group comprising thermoplastic resins and thermosetting resins; and wherein the sheet has a Gurley air permeability of between 8 and 50 seconds/300 cm³.

13. A sheet material according to claim 1, wherein the sheet has a maximum pore size of less than 22 μm.

14. A sheet material according to claim 13, wherein the sheet has a maximum pore size of less than 16 μm.

15. A sheet material according to claim 14, wherein the sheet has a maximum pore size of less than 12 μm.

16. A sheet material according to claim 1, wherein the sheet has a through plane resistance of less than 150 μ/cm.

17. A sheet material according to claim 16, wherein the sheet has a through plane resistance of less than 50 μ/cm.

18. A sheet material according to claim 1, wherein the primary carbon fibers have a cross section of between 4 and 12 μm.

19. A sheet material according to claim 18, wherein the primary carbon fibers have a cross section of between 5 and 10 μm.

20. A sheet material according to claim 1, wherein the primary carbon fibers are between 3 and 8 mm in length.

21. A sheet material according to claim 20, wherein the primary carbon fibers are about 6 mm in length.

22. A sheet material according to claim 1, wherein the sheet has a Gurley air permeability of between 8 and 50 seconds/300 cm³.

23. A conductive microporous sheet material comprising primary carbon fibers having a cross-sectional dimension of at least 1 μm, secondary carbon.

* * * * *